United States Patent [19]

Takasugi et al.

[11] Patent Number: 5,762,553
[45] Date of Patent: Jun. 9, 1998

[54] VIDEO GAME SYSTEM WITH AUXILIARY DISPLAY

[75] Inventors: Tomoya Takasugi; Masao Yoshimoto; Masayoshi Yamada, all of Tokyo, Japan

[73] Assignee: Sega Enterprises, Tokyo, Japan

[21] Appl. No.: 602,443

[22] Filed: Feb. 16, 1996

[30] Foreign Application Priority Data

Feb. 17, 1995 [JP] Japan .................................. 7-029650

[51] Int. Cl.[6] ......................................................... A63F 9/00
[52] U.S. Cl. ................................................................ 463/34
[58] Field of Search ............................. 463/13, 22, 30, 463/31, 32, 33, 34, 46

[56] References Cited

U.S. PATENT DOCUMENTS

| | | |
|---|---|---|
| 4,006,904 | 2/1977 | Felsher ........................ 463/22 |
| 4,398,723 | 8/1983 | Erickson et al. . |
| 4,572,509 | 2/1986 | Sitrick . |
| 4,976,438 | 12/1990 | Tashiro et al. . |
| 5,542,669 | 8/1996 | Charron et al. ................ 463/13 |

FOREIGN PATENT DOCUMENTS 60-180489  11/1985  Japan .

*Primary Examiner*—George Manuel
*Attorney, Agent, or Firm*—Price, Gess & Ubell

[57] ABSTRACT

A video game cabinet has an identical configuration on opposite sides. That is, each side has a video monitor display for displaying the contents of a game and an operation panel for entering player instructions for operating the game. Each side also has a speaker for generating effect sounds for the game play as well as a coin slot. Each side has a second display for showing a winner indication that is displayed when the player has continuously won the game, a third display for displaying the current number of wins, and a fourth display for maintaining/updating and displaying the maximum number of wins over a specified time period. A removable game processing circuit can execute the game play and drive the first display. A display control circuit can independently drive the second, third, and fourth display.

21 Claims, 4 Drawing Sheets

VIDEO GAME SYSTEM WITH AUXILIARY DISPLAY

BACKGROUND OF THE INVENTION

1. Field of the Invention

This invention relates to a video game system and, more particularly, to an independent scoring display system for adding excitement to the current play.

2. Description of Related Art

Among various game systems available today, the video game system is most popular. The video game system, which can draw images of persons, vehicles, space ships, etc. (hereafter called "characters") on a display screen, such as a CRT, includes an operator input device such as a joystick or buttons. With this input device, the player can manipulate the characters across the screen and can try to attain a specified purpose, for example, to win a war. Such video game systems, featuring sophisticated, versatile character movement, are widely accepted in homes and in video arcades.

Recently, more player competition-type video game systems have been introduced. A competition-type video game system has a plurality of input devices for players, and allows a plurality of characters to appear simultaneously on a display screen. When each player participates in a war, a car race, etc., he gives instructions to his own character, via an input device, to manipulate it as he wishes, usually in competition with the other players or in competition with a computer that can also drive one or more competitor images.

Typically, two players play a game on a competition-type video game system. Such a video game system has a similar input device and display screen on each side of a unitary cabinet so that the players are on opposite sides of the cabinet.

On a competition-type video game system, a player wants to compete with as many players as possible and can get more and more excited as he beats them in each game. However, on today's competition-type video game system, it is impossible to instantly know who is the current winner and how many players he has beaten.

This makes it difficult, even when a player has beaten many players, to provide sufficient satisfaction and excitement. This also prevents bystanders from fully participating in the game excitement, because they cannot instantly know the current player's skill level. Thus, a highly exciting video game system, which gives both the players and bystanders the information on the current user's skill, has long been awaited.

OBJECTS AND SUMMARY OF THE INVENTION

The present invention seeks to solve the problems associated with the prior art described above.

It is an object of this invention to provide a highly exciting video game system.

It is another object of this invention to provide a video game system which displays easy-to-understand information on the player's skill to both the players and the bystanders without limiting the playing field.

To achieve the above objects, one aspect of this invention is to provide a video game system allowing a plurality of players to play a game and to compete with each other. The video game system includes a first display member for displaying the contents of the game, such as a playing field and character images, and a second display member for displaying a win-loss result of the play, e.g. WINNER!, wherein the second display member and the first display member are separately and independently provided.

According to an aspect of this invention, when a player has continuously won a series of games displayed on the first display member, the second display member, which is physically separate from the first display member, can display the current win-loss result indicating the status of the winning player. This winner display can make a player feel satisfied and can create more excitement. At the same time, the display stimulates the bystanders and makes them feel tempted to participate in the game.

Another aspect of this invention is a video game system which further comprises a third display member for displaying the current number of wins of individual games over a predetermined sequence of play. According to this aspect of this invention, the third display member, which shows the current number of wins, provides an objective criteria for the skill of the player. This display makes the player feel satisfied and also gets him more excited. This also gives the bystanders the current information on the player's skill and thus makes them feel tempted to play the game and perhaps exceed the displayed player's skill level.

Another aspect of this invention is a video game system having a fourth display member for updating, maintaining, and displaying the maximum number of wins over a specified predetermined time period. According to this aspect of this invention, the maximum number of wins is updated/maintained and displayed. This makes both the player and bystanders feel tempted to update the maximum number of wins, and thereby get them more excited.

Another aspect of this invention is a video game system having a game processing circuit for executing a game allowing a plurality of players to play the game and compete with each other. The video game system includes a first display for displaying the contents of the game, a second display for displaying a win-loss result of the play, and a display control circuit for controlling the operation of the second display, wherein the display control circuit and the game processing circuit are separately provided so that conventional video games can be retrofitted with the display system of the present invention.

According to this aspect of this invention, the game processing circuit for executing the game and the display control circuit for controlling the second display are provided as separate units. This means that the results of many different types of video games may be displayed simply by replacing the game processing circuit with new game processing circuits dedicated to new games.

Another aspect of this invention is a video game system comprising a third display for displaying the current number of wins in the current sequence of play, the third display connected to a display control circuit. According to this aspect of this invention, two different displays, i.e., the second and third displays, are integrally controlled by one display control circuit to increase the processing efficiency and to make the video game system compact.

Another aspect of this invention is a video game system comprising a fourth display for updating/maintaining the maximum number of wins over a specified time to provide a goal for the current player and for displaying it. This fourth display is also connected to the same display control circuit.

According to an aspect of this invention, a plurality of displays, i.e., the second, third, and fourth displays, are integrally controlled by one display control circuit to increase the processing efficiency and to make the auxiliary display system compact.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

DETAILED DESCRIPTION OF THE PREFERRED EMBODIMENTS

Figure 1:
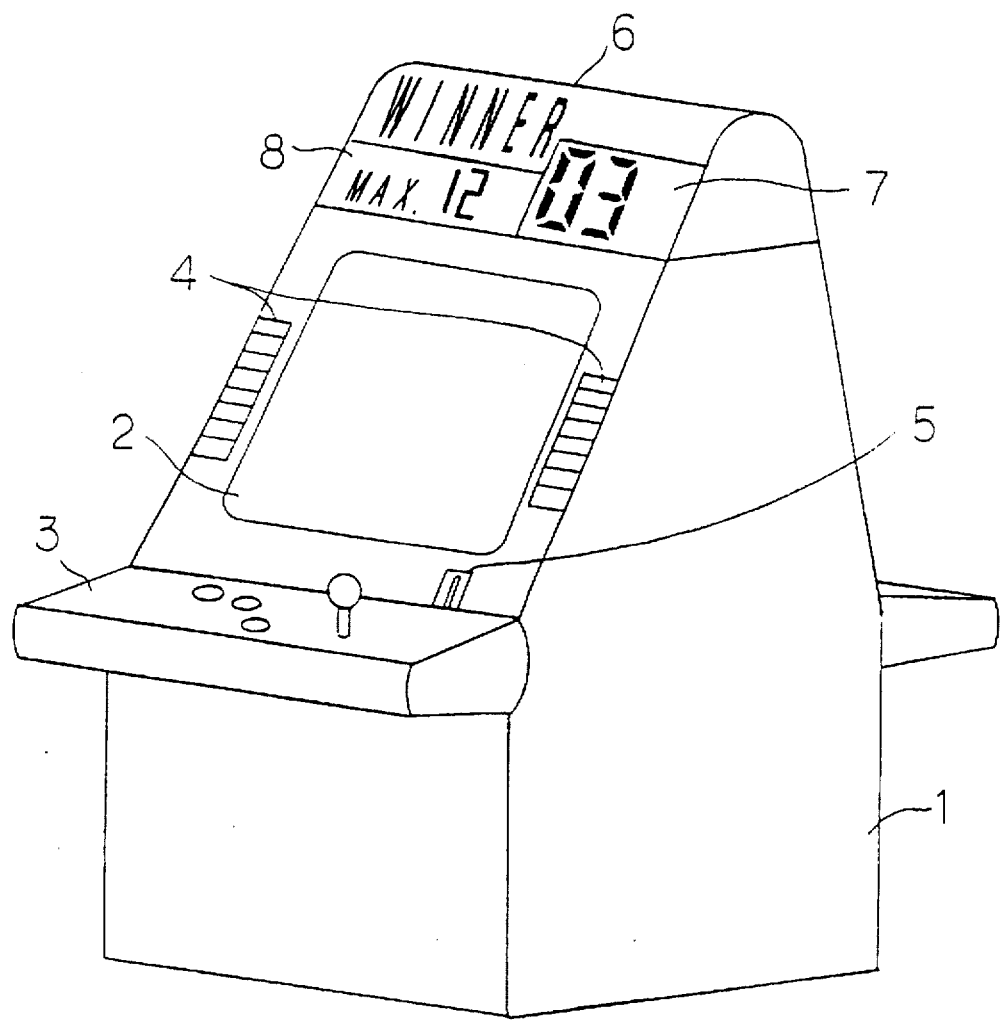
FIG. 1 is a perspective view showing an external view of a video game system of a first embodiment of this invention.

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically to provide a multiple display system that can supplement a stand-alone video game console.

Referring to the attached drawings, there is shown preferred embodiments of this invention having the following drawing symbols:

1: Cabinet
2: Video monitor
3: Operation panel
4: Speaker
5: Coin slot
6: Second display
7: Third display
8: Fourth display
11: Game processing circuit
12: Video circuit
13: Display control circuit
14: Backup battery
15: CPU
16: ROM
17: RAM
18: I/O port
19: Photocoupler
20: Driver
21: LED display
22: LED display
23: LED display
24: SSR
25: Lamp The first embodiment of the present invention is intended to promote a highly exciting video game system for a commercial application in a video game arcade by displaying easy-to-understand information on a player's game skill.

FIG. 1 is a perspective view showing an external view of a video game system of this embodiment (hereafter called "this system"). As shown in this figure, this system has a similar configuration on opposite sides of the cabinet 1. On each side, the cabinet has a video monitor 2 (corresponds to a first display member) which displays the contents of the game and an operation panel 3 through which the player manipulates the game. There is also a speaker 4 which generates effect sounds of the game and a coin slot 5 for activating the game.

Each side has an additional three displays which are separate from the video monitor 2. They are a second display 6 which displays when the current player is a winner (winner display), a third display 7 which displays the number of opponents the player has already beaten during the play cycle (current number of wins), and a fourth display 8 which displays the maximum number of opponents the player or even a previous player has beaten over a specified time period (maximum number of wins), e.g. the current champion of total wins. The second display 6, third display 7, and fourth display 8 are all located above the video monitor 2 and can be removably installed as a single unit on top of a conventional video game system. Its configuration as shown in FIG. 1 is compatible with an extension of the conventional cabinet.

The second display 6, which displays that the player is a winner, can be composed of red semitransparent synthetic resins. Within this display is a lamp which can blink for a set time period while the current player is a winner. In addition, the second display 6 has the characters WINNER which can remain lit while the player is a winner. These characters may also be composed of LEDs or electroluminescence members. The third display 7 has a two-digit LED display which shows the current number of wins. The fourth display 8 has a two-digit LED display which shows the maximum number of wins.

Figure 2:
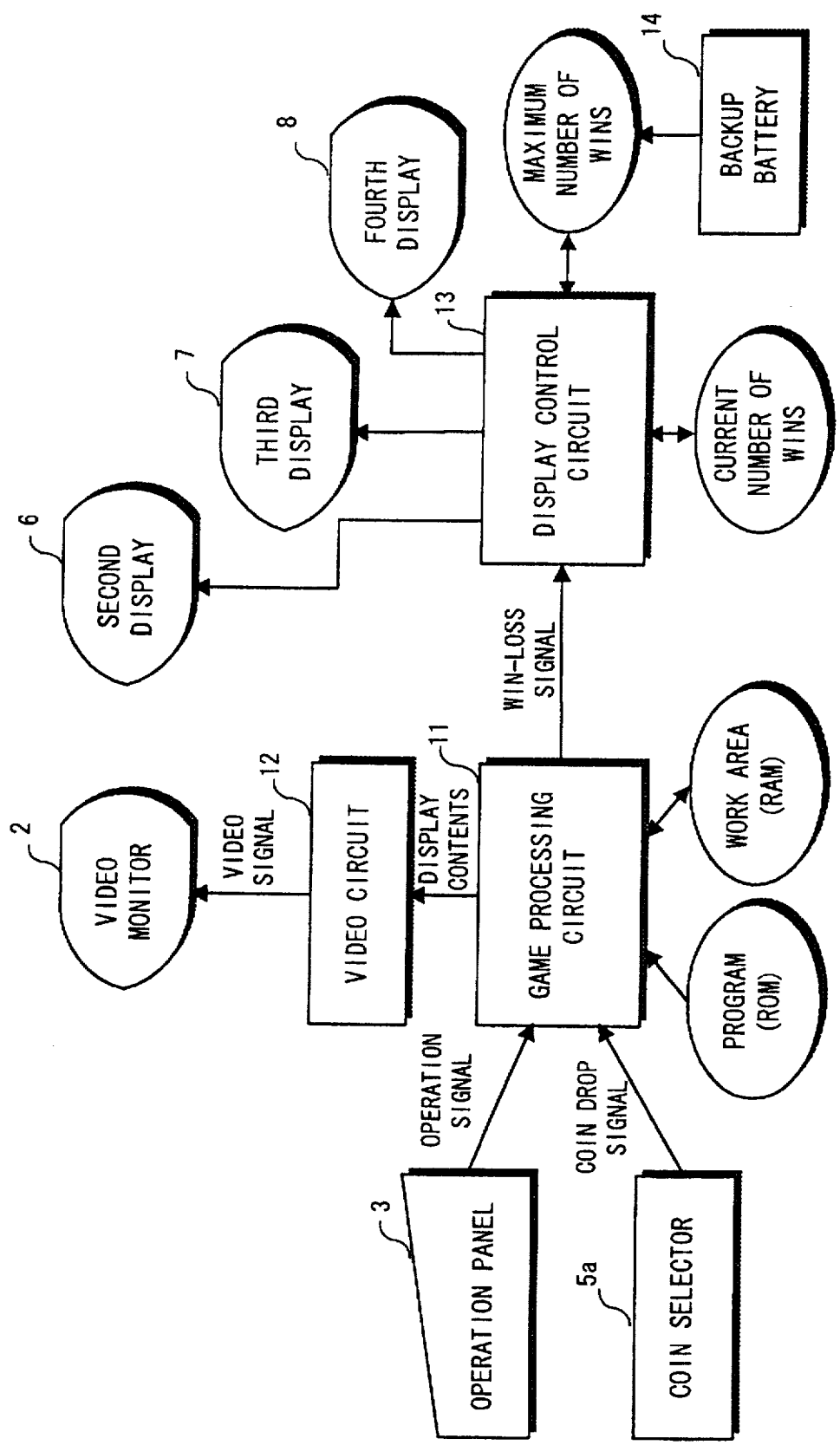
FIG. 2 is a functional block diagram showing a circuit configuration of the video game system of the first embodiment of this invention.

FIG. 2 is a functional block diagram showing a circuit configuration of this video system. As shown in this diagram, this system has a game processing circuit 11 which processes a game program based on the operation signals sent from the operation panel 3 by the player while also reading program routines from a ROM and using the work areas allocated in a RAM. Upon detecting a coin drop signal from the coin selector at the coin slot 5, this game processing circuit 11 starts the game and, when the game ends, generates a win-loss signal indicating which player has won.

The game processing circuit 11 is connected, via the video circuit 12, to the video monitor 2. The display contents, determined by the game processing circuit 11, are converted to video signals for display on the video monitor 2.

This system also has a display control circuit 13 which displays and controls the winner display, the current number of wins, and the maximum number of wins. This display control circuit 13 is mounted on a board separate from that of the game processing circuit 11. The display control circuit 13 receives a win-loss signal from the game processing circuit 11, and can independently update the current number of wins and the maximum number of wins. It displays the WINNER display on the second display 6, the current number of wins on the third display 7, and the maximum number of wins on the fourth display 8. Even after the video game system power is turned off and then turned on, the maximum number of wins can be maintained because it is backed up by a backup battery 14.

Note that the second display 6 and display control circuit 13 can comprise a second display means, that the third display 7 and display control circuit 13 can comprise a third display means, and that the fourth display 8, display control circuit 13, and backup battery 14 can comprise a fourth display means.

Figure 3:
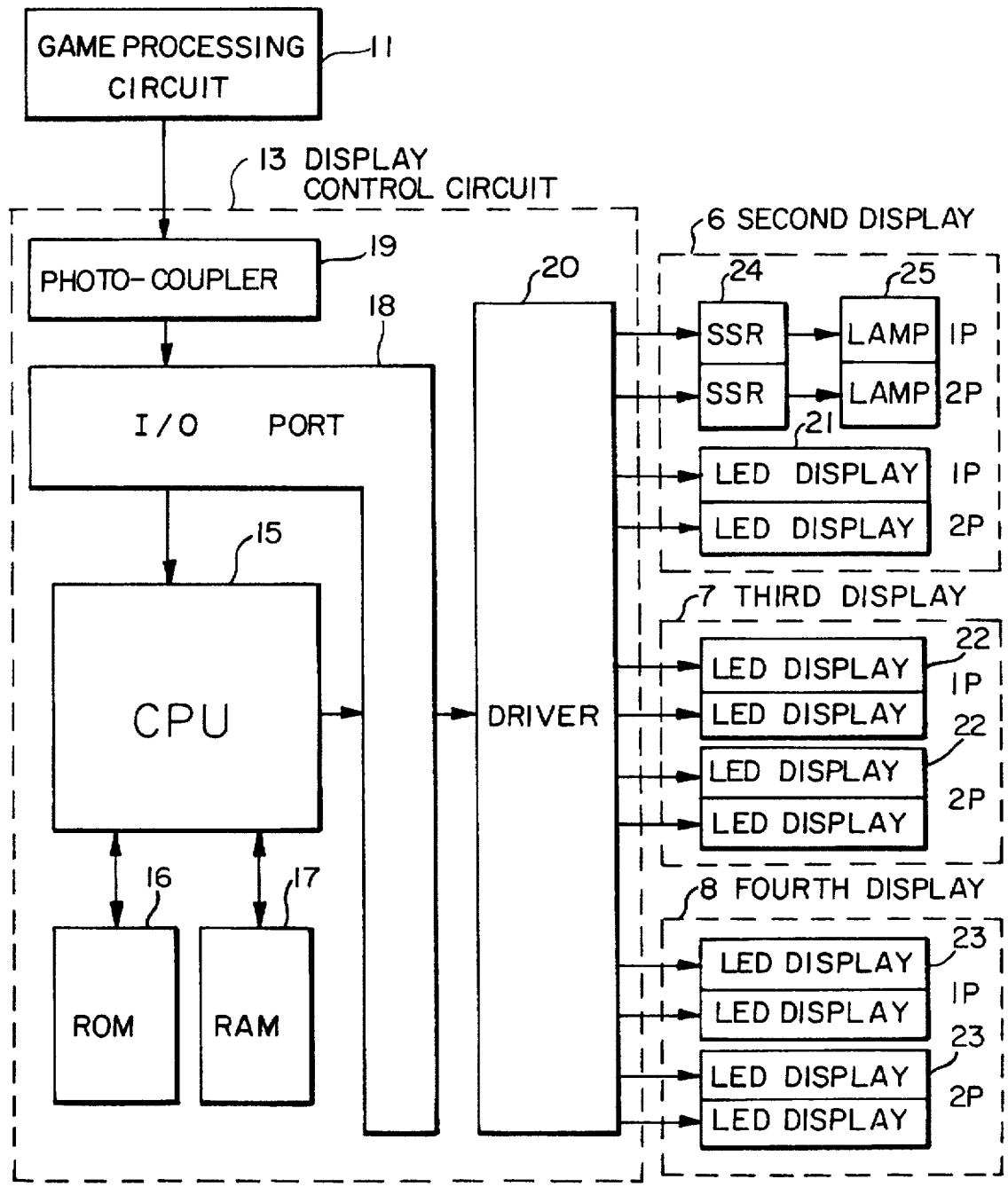
FIG. 3 is a circuit block diagram showing a configuration of a display control circuit used in the video game system of the first embodiment of this invention.

Referring to the circuit block diagram in FIG. 3, there is shown a sample configuration of the display control circuit 13. As shown in this diagram, the ROM 16 containing the display control program and the RAM 17 used for the work area are connected to the central processing unit (CPU) 15. A photocoupler 19 and a driver 20 are connected to the CPU 15 via the I/O port 18. The photocoupler 19 acts as a connector between the display control circuit 13 and the game processing circuit 11. Such a photocoupler arrangement facilitates an easy addition or removal of a communication link between the game processing circuit 11 and a display control circuit 13. The driver 20 is a display driver circuit composed of transistors. To this driver 20, the LED displays 21 for use on the second display 6 which displays characters, the two-digit LED displays 22 for use on the third display 7, and the two-digit LED displays 23 for use on the fourth display 8 are connected, each for one player (1P) and two players (2P). Also connected to the driver 20 is the SSR 24 through which the lamps 24 of the second display 6 are connected to an AC power source which is not shown in the diagram. The SSR 24 is a semiconductor relay which controls the connection between the lamp 25 and the AC power.

Figure 4:
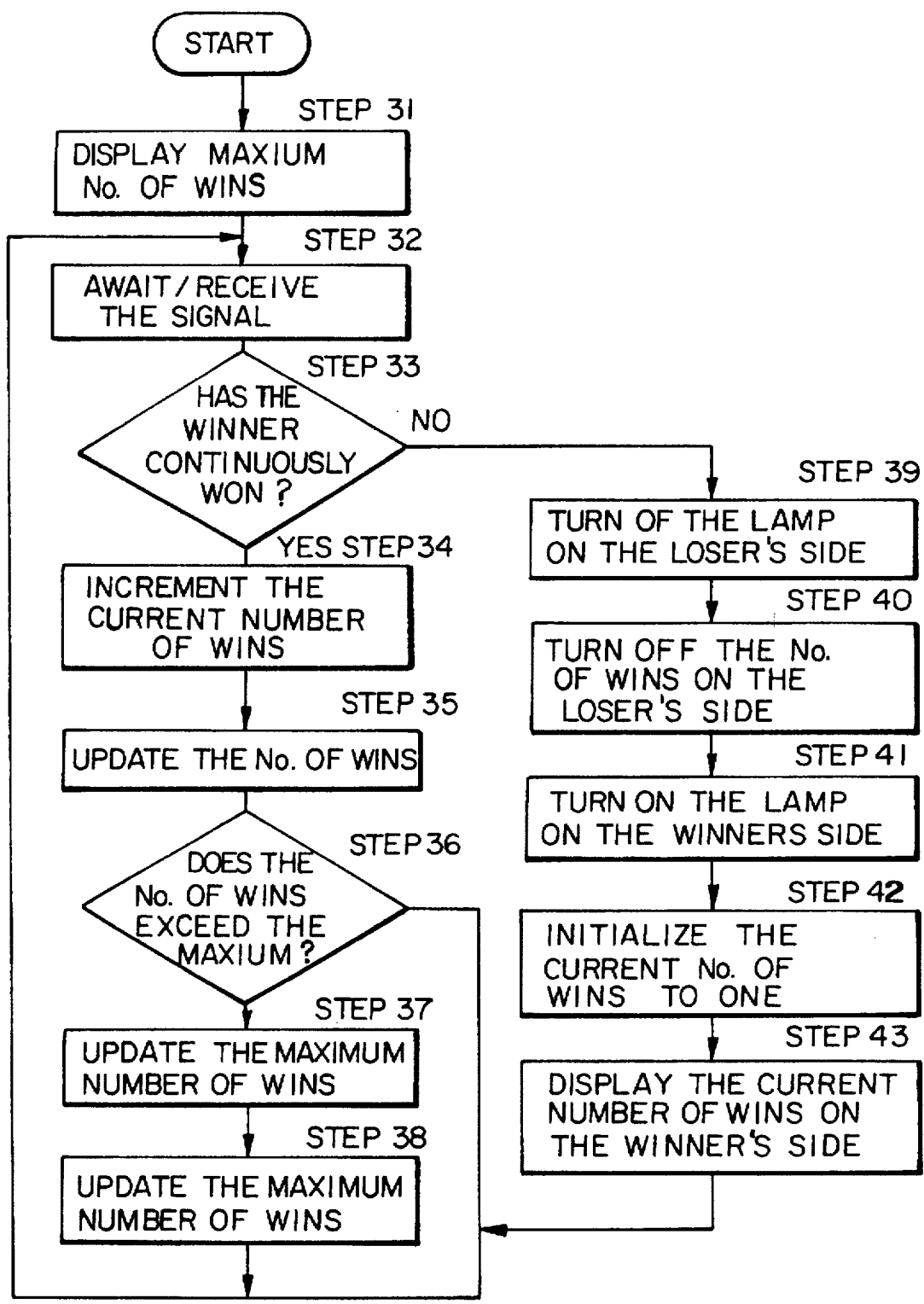
FIG. 4 is a flow chart showing the operation of the display control circuit used in the first embodiment of this invention.

The first embodiment having the configuration described above performs its operation as follows. FIG. 4 is a flow chart showing the operation of the display control circuit 13 of this system. This system stores information representing the number of maximum wins in the RAM which is powered by the backup battery 14. Although the maximum number of wins usually indicates the maximum number since this game system was manufactured, the system may be alternatively designed so that a player is able to initialize it through a predefined operation. The display control circuit 13 reads the maximum number of wins immediately after the power is turned on and displays it on the fourth display 8 in the digital format (step 31). Then, the circuit waits for a win-loss signal to be sent from the game processing circuit (step 32). This video game system allows a player to select one of two modes: a one-player mode in which a player plays the game with the computer, and a two-player mode in which a player plays the game with another player. In both modes, the contents of the game are displayed on the video monitor. In the two-player mode, when one of the players has continuously beaten the opponents, the second display 7 on the winning player side displays the characters WINNER and, at the same time, blinks the winner display lamp. In addition, the third display 7 displays the current number of wins.

These display operations are performed as follows. The game processing circuit 11 generates a win-loss signal each time the game is over. The win-loss signal is a digital signal indicating which player has won. If the winner has continuously won the game (step 33), the display control circuit 13 increments the current number of wins by one (step 34) and updates the number of wins on the third display 7 (step 35). If the winner has continuously won the game and the current number of wins exceeds the maximum number of wins (step 36), the circuit replaces the maximum number of wins with the current number of wins (step 37) and immediately updates the maximum number of wins on the fourth display (step 38).

If the winner, indicated by the win-loss signal, has changed (step 33), the circuit turns off the lamp on the loser's side (step 39) and the current-number-of-wins indication on the loser's side (step 40). Instead, the circuit turns on the lamp on the new winner's side (step 41), initializes the current number of wins to 1 (step 42), and displays the current number of wins on the third display 7 on the winner's side (step 43).

The following explains, in detail, how the display control circuit 13 operates. The win-loss signal from the game processing circuit 11 is sent to the CPU 15 via the photocoupler 19 and the I/O port 18. Upon receiving this signal, the CPU 15 sends the display control signal to the driver 20 according to the display control program stored in the ROM 16. Then, the driver 20 sends the drive signal to the LED displays 21, 22, 23, and SSR 24 according to the display control signal. The LED displays 21, 22, and 23 each display data according to the corresponding drive signal. The SSR 24 performs relay switching according to the drive signal to turn on or blink the lamp 25. The current number of wins and the maximum number of wins are maintained in the RAM 17.

Steps 39 to 43 are performed for the loser's side even after the win-loss signal is received for the first time after the power is turned on. In this case, the display turn-on/turn-off operation on the loser's side is redundant. However, other steps are required to turn on the display for the first winner.

The display of the current number of wins may be started when the player has continuously won the game a specified number of times (for example, three consecutive times). The winner display and the current number of wins may be turned off at any time. For example, if a coin is not dropped within a specified time period after the game is over, the display may be canceled assuming that the players have changed. Thus, an appropriate countercircuit can be set to a specific time period.

As described above, when a player continuously wins the games, the video game system in this embodiment displays the winner display, indicating that the player is a winner, on the second display 6 which is separate from the video monitor 2 which is the first display means. This winner display makes the player feel satisfied and gets him more excited. At the same time, the display stimulates the bystanders and makes them feel tempted to participate in the game.

The winner display, indicated by the blinking lamp and the characters, visually stimulates the players and bystanders and, as a result, gets them more excited.

In this embodiment in which the second display 6, third display 7, and fourth display 8 are located above the video monitor 2, the winner display stands out, to attract the player's or bystander's attraction, and to get them more exited.

The third display 7, which shows the current number of wins, provides an objective criteria for the skill of the player. This also gives bystanders information on the player's skill and thus makes them feel tempted to play the game. This embodiment displays the current number of wins, enabling the players and bystanders to understand it instantly. It also updates and displays the maximum number of wins, thus making both players and bystanders to feel tempted to beat the maximum number of wins.

The video game system of this embodiment is a competition-type game system in which the players sit face to face. And, the second, third, and fourth display means on each side further stimulate the player's desire to compete. Thus, this invention especially brings great benefits to the player and the arcade owner.

The display control circuit 13, which integrally controls various types of displays and lamps such as the LED displays 21, 22, and 23 and lamp 25, increases the processing efficiency and makes the video game system more compact.

The game processing circuit 11 and the display control circuit 13, although connected by the photocoupler 19, are separate circuits. Therefore, as long as a signal from the game processing circuit 11 is compatible with a signal that drives the display control circuit 13, replacing only the game processing circuit 11 with another game processing circuit 11 makes it possible, in many kinds of games, to turn on the current number of wins, the maximum number of wins, and the characters WINNER and to turn on and blink the winner display.

This invention is not restricted to the preferred embodiment described above, but may be embodied in other specific forms, such as those described below, without departing from the spirit or essential characteristics thereof. For example, the third and fourth display means, while significantly adding to the invention, are not always required. The first display means and other display means also may be any type of display such as a liquid crystal display, video projector, or electroluminescence unit.

The characters displayed on the second display means need not by WINNER, but rather may be any characters indicating a win-loss result of the game such as "WINNING" or "LOSER." In addition, these characters need not be displayed on a LED display or electroluminescence display and the characters may be written on a synthetic resin plate under which a lamp is provided.

Instead of the number of wins, the third display means may display as many opponent characters as the number of wins. This display gives the player the intuitive, realistic information on the number of wins, making the game more exciting.

The second, third, and fourth displays need not be located above the first display means. The win-loss result shown on the second display means need not be indicated by light, but may be indicated on a display plate or by such characters as a doll waving a flag. The number of wins displayed on the third display means is not limited to a number or opponent characters, but may be as many circles or squares as the number of wins.

When a winning player plays a noncompetition game, the third display means may be constructed so that it maintains the number of wins before the current game. In this case, the system does not count the number of wins of the player when he plays the game with the computer. Therefore, the display shows the number of times the player has actually beaten the opponents, increasing the reliability of the display of wins.

The third display means may be constructed so that it resets the number of wins if the player loses during a noncompetition game. In this case, the system resets the number of wins if the player loses during a noncompetition game. This makes it difficult for the player to maintain the current number of wins, getting the player more excited.

The signal sent from the game processing circuit 11 to the display control circuit 13 may be code signals, instead of a win-loss signal, each corresponding to the display mode of each display. For example, assigning hexadecimal numeric codes to the numeric patterns or the lamp on-off or blink patterns to be displayed on the displays 21, 22, and 23 makes it possible for number codes to be displayed on the LED displays 21, 22, and 23. It also makes it possible for the lamp 25 to turn on or blink according to the number codes from the game processing circuit 11. If the code signal compatibility is still maintained in the video game system in this configuration, another game processing circuit 11 may be used, ensuring the versatility of the display control circuit 13 as in the above embodiment.

The game processing circuit 11 may be able to maintain the number of wins and the maximum number of wins. In particular, when the game processing circuit 11 sends code signals to the display control circuit 13, the game processing circuit 11 generates code signals according to the number of wins. This requires the game processing circuit 11 to maintain and update the current number of wins and the maximum number of wins.

The LED displays 21, 22, and 23 can display not only numbers, such as the current number of wins, but also ornamental symbols. In particular, a 7-segment or 16-segment display or dot-matrix display can display characters as well. When ornamental symbols or characters are displayed, assigning numeric codes or symbols to characters makes it possible for code signals, compatible with the display of the number of wins, to be used.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A video game system allowing one player to play an interactive game alone or a plurality of players to play a game in competition with each other, said video game system comprising:

a video game housing;

first display means mounted in the video game housing for displaying the contents of said game play; and an auxiliary display member mounted on a top of the video game housing including second display means for displaying a win-loss result of said game play, and third display means for displaying the current number of wins in said game play wherein said second display means and said third display means are separately provided to the player on the top of the video game housing from the first display means in the video game housing.

2. A video game system as claimed in claim 1, wherein said third display means displays said current number of wins in as many opponent characters as said current number of wins.

3. A video game system as claimed in claim 1, wherein said third display means maintains the number of wins before the current game when said player, who has continuously won, plays a noncompetition-type game against a computer-based game play.

4. A video game system as claimed in claim 1, wherein said third display means resets said current number of wins when said player, who has continuously won, loses in a noncompetition-type game.

5. A video game system as claimed in claim 1, further comprising a fourth display means for updating, maintaining, and displaying a maximum number of wins over a specified time period.

6. A video game system as claimed in claim 5, including a cabinet, wherein both sides of the cabinet include first display means, an operation panel for giving instructions to a game, and a fourth display means.

7. A video game system as claimed in claim 1, including a cabinet, wherein both sides of the cabinet include first display means, an operation panel for giving instructions to a game, and said third display means.

8. A video game system as claimed in claim 1, including a cabinet, wherein both sides of the cabinet include first display means, an operation panel for giving instructions to a game, and said second display means.

9. A video game system having a game processing circuit for executing a game allowing a plurality of players to play the game and compete with each other, said video game system comprising:

a video game housing;

a first display in the video game housing for displaying the contents of said game play resulting from said game processing circuit;

a second display on the video game housing for displaying a win-loss result of said game play; and a display control circuit for controlling the operation of said second display, wherein said display control circuit and said game processing circuit are physically separated so that said game processing circuit can be replaced independently of said display control circuit.

10. A video game system as claimed in claim 9, further comprising a third display, for displaying the current number of wins in said game play, connected to said display control circuit.

11. A video game system as claimed in claim 10, further comprising a fourth display, for updating/maintaining a maximum number of wins over a specified time period and for displaying it, connected to said display control circuit.

12. A video game system as claimed in claim 11, wherein said fourth display has at least one LED display or dot matrix display controlled by a driver connected to said display control circuit.

13. A video game system as claimed in claim 10, wherein said third display has at least one LED display or dot matrix display controlled by a driver connected to said display control circuit.

14. A video game system for permitting a player to play a video game comprising:

a ROM video game program;

control means for player input;

a game processing circuit for executing the video game program in accordance with a player input from the control means and providing an output signal representative of whether a player wins a video game;

a first display member for providing images associated with the play of the video game by the player;

a display control circuit for receiving the output signal;

a second display member independent of the first display member for indicating a win by a player, whereby the display control circuit drives the second display to visually display a win; and a third display member is driven by the display control circuit to simultaneously display a current number of wins by a player in a predetermined sequence of play.

15. A video game system as claimed in claim 14, wherein a fourth display member is driven by the display control circuit to simultaneously display a maximum win number achieved over a predetermined time period on the video game system.

16. A video game system as claimed in claim 15, wherein the game processing circuit output signal is input into the display control circuit by a photo-coupler apparatus.

17. A video game system as claimed in claim 15, wherein the first display member and control means are mounted in a housing member and the display control circuit and second, third, and fourth display members are separately supported on top of the housing member.

18. A video game system that permits an interactive game play on a first display means for displaying the contents of said game play with the results of the game play being displayed on a plurality of displays independent of the first display means comprising:

a video game housing mounting the first display means in the housing;

a first operation panel mounted on the video game housing for providing input signals from a player;

a game processing computer circuit which generates an interactive game in response to a stored game program and input signals from the operation panel including an output game result signal indicating a win and a loss of the interactive game;

a video circuit in the video game housing for driving the first display means to display a playing of said game play;

at least a second display and a third display mounted on top of the video game housing;

a display control computer circuit for controlling the second and third displays by processing the game result signal with a display routine so that one of the second and third displays indicates a current win status for a player and the other of the second and third displays indicates a total number of consecutive wins for the player; and connection means for connecting the game processing computer circuit with the display control computer circuit whereby the video game system can accommodate a change in video games to be played in the video game system by a replacement of stored game programs.

19. The video game system of claim 18 wherein the connection means includes a photo coupler link between the game processing computer circuit and the display control computer circuit.

20. The video game system of claim 18 further including a fourth display and the display routine can further process a display of the maximum number of wins over a predetermined time period to be displayed on the fourth display.

21. The video game system of claim 18 wherein the video game housing mounts a first display means on one vertical side of the housing and a second display means and a second operation panel on an opposite vertical side of the video game housing to permit two players to compete with the second and third displays disclosing the results of the competition of the interactive game play.

* * * * *